United States Patent [19]

Treible et al.

[11] 4,294,214
[45] Oct. 13, 1981

[54] ENGINE COMBUSTION CONTROL SYSTEM

[75] Inventors: Edwin S. Treible, Ringoes; Joseph A. Dopkin, Hopewell, both of N.J.; Raymond N. Alford, Coopers Plains, N.Y.

[73] Assignee: Ingersoll-Rand Co., Princeton, N.J.

[21] Appl. No.: 198,531

[22] Filed: Oct. 20, 1980

Related U.S. Application Data

[62] Division of Ser. No. 96,426, Nov. 21, 1979, Pat. No. 4,263,883.

[51] Int. Cl.³ .............. F02B 75/10; F02B 3/02; F02D 1/00; F16K 17/34
[52] U.S. Cl. .................. 123/458; 123/459; 123/495; 123/440; 137/495
[58] Field of Search ............ 123/458, 459, 440, 489, 123/511, 464, 457; 137/495

[56] References Cited

U.S. PATENT DOCUMENTS

| | | | |
|---|---|---|---|
| 2,833,304 | 5/1958 | Fish | 137/495 |
| 2,884,003 | 4/1959 | Jensen | 137/495 |
| 3,403,944 | 10/1968 | Thirion | 137/495 |
| 3,730,159 | 5/1973 | Sallot | 123/457 |
| 3,942,496 | 3/1976 | Eisele et al. | 123/458 |
| 3,970,063 | 7/1976 | Mayr et al. | 123/459 |
| 4,153,023 | 5/1979 | Asano et al. | 123/440 |
| 4,188,971 | 2/1980 | Otteson | 137/495 |
| 4,205,636 | 6/1980 | Kimatu et al. | 123/458 |
| 4,209,068 | 6/1977 | Jones et al. | 123/458 |
| 4,228,777 | 10/1980 | Haase | 137/495 |

Primary Examiner—Raymond A. Nelli
Attorney, Agent, or Firm—D. W. Tibbott; B. J. Murphy

[57] ABSTRACT

The system comprises a zirconium sensor interposed in the exhaust conduit of a gas-fueled engine for sensing both oxygen content and temperature of the exhaust gases, and for emitting electrical analog signals thereof to a comparator/controller. In turn, the latter transmits a complementary, derivative electrical signal to a current-to-pressure transducer. The transducer is supplied with gas under pressure, from the engine fuel (gas) supply line, and the pressure of this transducer-supplied gas is modulated by the aforesaid derivative signal. The modulated gas pressure is communicated with a gas cylinder, having a translating piston rod, which is operatively engaged with an otherwise standard gas engine regulator for trimming control of the flow of fuel (gas) through the regulator.

7 Claims, 4 Drawing Figures

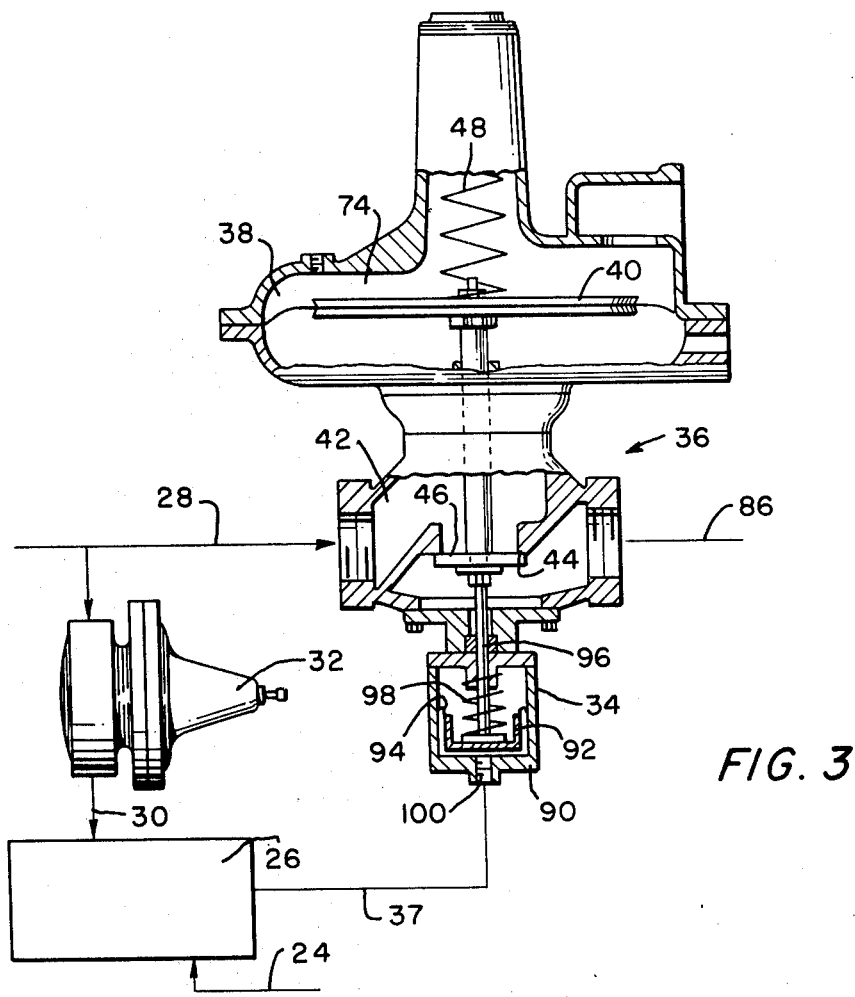
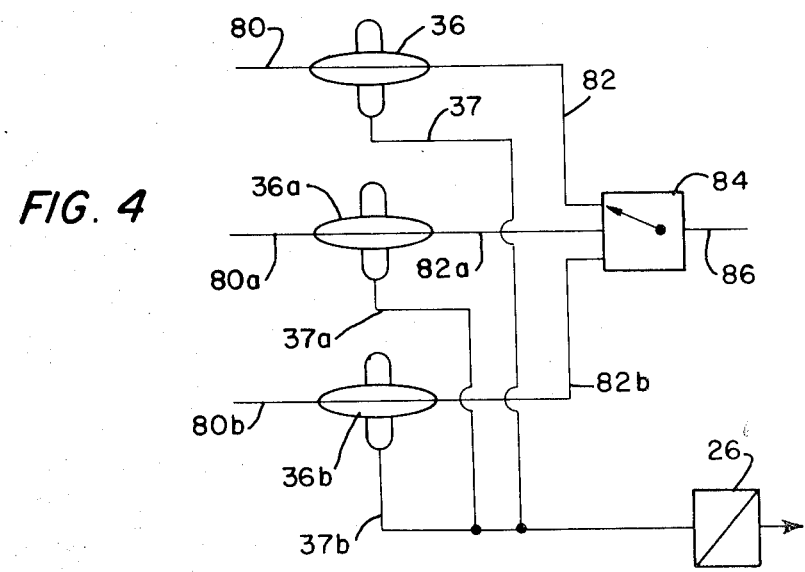
FIG. 3
FIG. 4

ENGINE COMBUSTION CONTROL SYSTEM

This application is a division, of application Ser. No. 096,426, filed Nov. 21, 1979 now U.S. Pat. No. 4,263,883.

In a practical engine cumbustion control system some elemental quantity should be monitored which is directly related to air-fuel ratio but only remotely related to other engine variables. This elemental quantity is uncombined oxygen subsisting in the engine exhaust. By monitoring or sensing oxygen in the engine exhaust, and using its analog to modulate a closed-loop, air-fuel ratio control system one can dispense with the necessity of measuring other variables related to air-fuel ratio. In addition, with such an arrangement, the air-fuel ratio could be automatically adjusted to compensate for small changes in fuel (gas) BTU content.

There are two prime reasons for such a control system. One is: increased fuel economy, as a result of running an engine lean. Normally, running an engine near its lean limit is not done without a person on hand to make manual adjustments and thus avoid misfiring. It is an object of this system to allow engine operation near the lean limit without the necessity of making manual adjustments.

The other principal reason for such a control system is that it offers lowered emissions of $NO_x$, HC and CO. By proper system manipulation of the air-fuel ratio, exhaust emissions can be greatly reduced without the need for a catalytic converter. Now, in the event the even lower emissions are required, the object control system can be used in addition to a catalytic converter. In this latter circumstance, such a converter could be reduced in size and cost as compared to one sized to operate without such a control system.

It is a particular object of this invention, then, to disclose such a closed-loop, air-fuel ratio, engine combustion control system designed especially to be used with gas-fueled engines which are either naturally-aspirated or turbocharged.

Another object of this invention is to set forth an improved combustion control system for an engine having an exhaust conduit and fuel and air inlet lines, comprising temperature and oxygen sensor means, for interpositioning in the engine exhaust conduit, for: (a) admitting engine exhaust gases thereinto, and (b) for emitting electrical signals representative of or analogous to both engine exhaust temperatures and engine exhaust oxygen content; signal comparator/controller means, coupled to said sensor means, for emitting discrete, unitary electrical signals derivative of said temperature and oxygen-content signals; and fuel-regulating means, for interpositioning in said fuel inlet line, coupled to said comparator/controller means and responsive to said discrete, unitary signals for regulating fuel conduct through said fuel inlet line; wherein the improvement comprises means coupled to said sensor means for inhibiting engine exhaust gas pressure surges therewithin.

Yet another object of this invention is to disclose an improved combustion control system for an engine having an exhaust conduit and fuel and air inlet lines, comprising temperature and oxygen sensor means, for interpositioning in the engine exhaust conduit, for: (a) admitting engine exhaust gases thereinto, and (b) for emitting electrical signals representative of or analogous to both engine exhaust temperatures and engine exhaust oxygen content; signal comparator/controller means, coupled to said sensor means, for emitting discrete, unitary electrical signals derivative of said temperature and oxygen-content signals; and fuel regulating means, for interpositioning in said fuel inlet line, coupled to said comparator/controller means and responsive to said discrete, unitary signals for regulating fuel conduct through said fuel inlet line; wherein the improvement comprises transducer means comprised by said fuel regulating means for transforming said unitary, electrical signals into analogous fluid pressures.

Further objects of this invention, as well as the novel features thereof, will become more apparent by reference to the following description, taken in conjunction with the accompanying figures in which:

FIG. 3 is a vertical, cross-sectional view of the gas engine regulator valve, of the FIG. 1 system, modified, according to the invention, to accommodate a trim-control gas cylinder; and FIG. 4 is a diagrammatic illustration of a portion of a system similar to that of FIG. 1 modified to accommodate a plurality of gas-well fuel sources of disparate BTU values.

Figure 1:
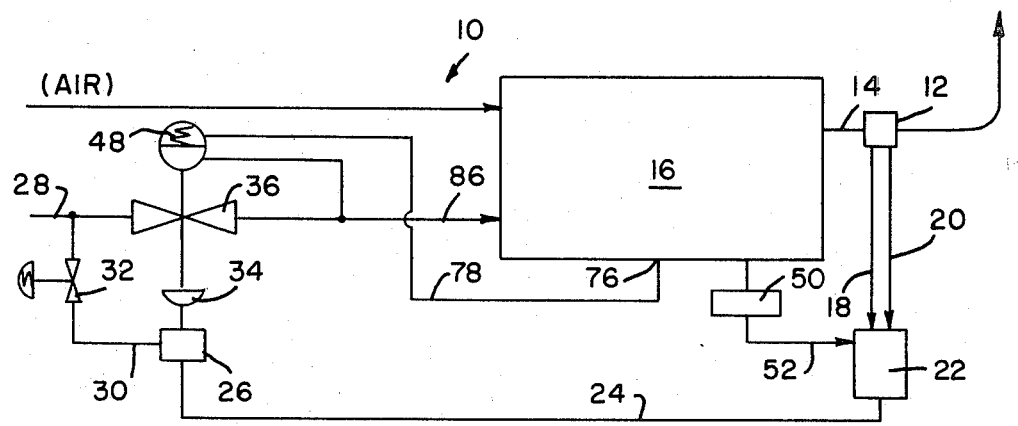
FIG. 1 is a schematic diagram depicting the novel engine combustion control system, according to an embodiment thereof, in operative association with a gas-fueled engine.
Figure 2:
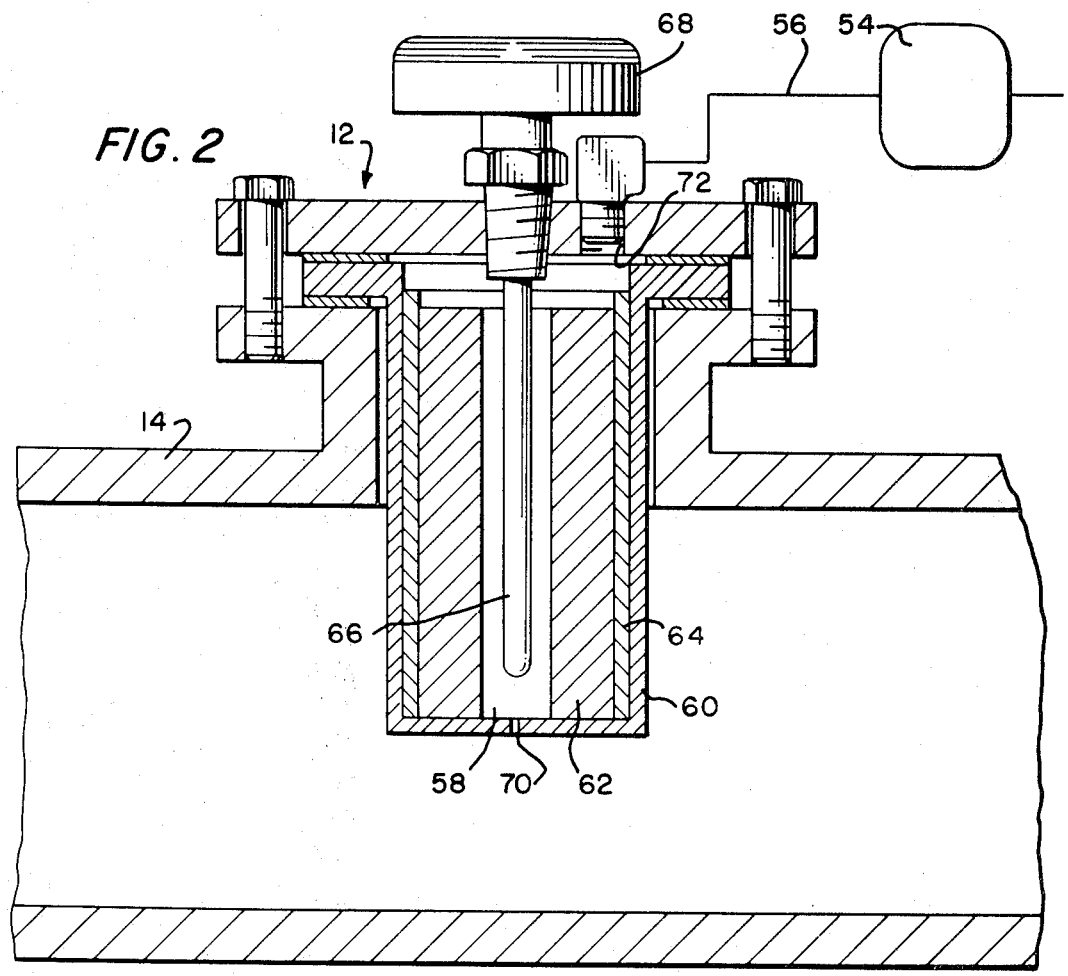
FIG. 2 is a vertical cross-sectional view of the zirconium sensor, of the FIG. 1 system, interposed in the exhaust conduit of the engine.

As shown in FIGS. 1 through 3, the novel combustion control system 10 comprises a zirconium oxygen and temperature sensor 12 interposed in the exhaust conduit 14 of a gas-fueled engine 16. The sensor 12 has a pair of output lines 18 and 20 through which analogous, electrical signals representative of the oxygen content of the exhaust, and the exhaust temperature, are conducted to a comparator/controller 22. The comparator/controller 22, in turn, generates a unitary signal representative of (i.e., derivative from) the oxygen and temperature signals, which derivative signal is transmitted by a line 24 to a current-to-pressure transducer 26. A gas line 28 from a supply (not shown) has tap-off line 30 which, via a pressure reducer 32, supplies gas under pressure to the transducer 26. With variations in exhaust temperature and oxygen content, of course, the derivative signal will manifest complementary excursions or modulations. Accordingly, pursuant to the modulations of the derivative signal from the comparator/ controller 22, the transducer 26 provides an excursive or modulated fluid pressure to a gas cylinder 34 fixed to the lower end of a gas engine regulator valve 36 via line 37.

As shown, and as is standard with such regulator valves, valve 36 comprises a pressure chamber 38 compartmented by a diaphragm 40, and fuel chamber 42 with an orificed valve seat 44 and a valving element 46. A heavy spring 48 biases the pressure-responsive diaphragm 40 and valving element 46 to an "open" position whereby fuel gas from the line 28 is freely admitted therethrough, supplying a given gas flow to the engine 16. Depending upon the oxygen content and the temperature of the exhaust and, more directly, the pressure in line 37, the gas cylinder 34 either opposes or yields to the biasing of spring 48; consequently, the gas cylinder 34 provides a trim control of the fuel flow.

As shown in detail, in FIG. 3, the gas cylinder 34 comprises a cylinder 90 in which a piston 92 is reciprocably disposed. A rolling diaphragm-seal 94, carried by piston 92, fluid-seals between the upper and lower ends of the cylinder. The piston 92 carries a rod 96 which penetrates into valve 36, the terminal end of the rod 96 effecting an abutting engagement with the valving element 46 (in valve 36). A spring 98 biases the piston 92 towards the lower end of the cylinder 90, and line 37 (which carries the excursive or modulated "trimming" gas pressure) communicates with an orifice 100 formed in the lower end wall of the cylinder.

The spring 48 in the regulator valve 36 is initially adjusted (in the absence of a signal from line 37) so that the engine 16 is in a "rich" running mode. A pneumatic, trimming signal from line 37 will tend to lean the air-fuel mixture to the engine in proportion to the amplitude of the signal. Any change in the mixture will be reflected in the oxygen concentration in the exhaust and thus the control loop of the novel system 10 is closed. The system 10 trims the fuel gas to the engine 16 in response to various engine operating parameters (load changes, etc.) which are reflected in the exhaust oxygen content. The system 10 maintains the oxygen concentration at a predetermined level (set point) and thus maintains the required or optimum air-fuel ratio. In this embodiment, line 28 provides fuel (gas) at approximately twenty-five psi, and the reducer 32 supplies a quantity thereof to the transducer 26 at approximately twenty psi. From the latter, then, the line 37 addresses the pneumatic trimming signal to the gas cylinder 34 with an amplitude taken from a range of approximately two to twenty psi and, specifically in this embodiment, with a swing of from approximately three to fifteen psi.

The comparator/controller 22, per se, is not a subject of this invention. Such devices, as well as current-to-pressure tranducers 26, are commercially available and, consequently, the structure and circuitry thereof are not set out herein; the same are well known to those skilled in this art. However, it may be useful to briefly outline the functioning of the comparator/controller 22. The sensor 12 provides the aforesaid temperature and oxygen-content signals to an analyzer (comprised by the comparator/controller); the latter produces a composite signal therefrom. The composite signal is presented to a comparator (also comprised by the device) which determines any difference in the value thereof against a optimum, predetermined value or "setpoint" (priorly noted). In turn, pursuant to any deviation in the composite signal vis-a-vis the setpoint value, the comparator/controller 22 produces the aforesaid derivative signal, of from perhaps one-half to eight milliamperes of current, but from one to five ma. in this embodiment, to the transducer 26. Means (not shown) are provided, of course, for adjusting the setpoint value for given engine operating conditions and loads. According to this first embodiment of the invention, the comparator/controller 22 has a single (albeit variable) setpoint.

According to an alternative embodiment, the comparator/controller 22 has a pair of setpoints—for the following reason: very rapid engine load transients, as might be encountered in a generator set, give rise to special requirements with regard to an air-fuel ratio control system. An engine 16 running very "lean" at low load with, for example, six percent oxygen in the exhaust, will have little reserve if the load is increased or decreased very rapidly. To avoid this problem, the system 10 has an input signal from the engine manifold vacuum (which varies with load). A pressure transducer 50 throughconnected with the manifold senses both absolute values, and rate of change, of manifold depression. Thus the line 52, carrying the signal from transducer 50 provides a means of switching setpoints in the comparator/controller 22 from one to another of the pair of setpoints. By way of example: running the engine 16 an 23/1 air-fuel ratio and six percent oxygen in the exhaust, as a first setpoint, it will be possible to switch to one percent oxygen, as the other setpoint, until the effect of the load transient is over, and then switch back to the six percent setpoint. This will allow the engine 16 to recover smoothly.

It is somewhat common in prior art combustion control systems to employ a zirconium sensor 12 in the exhaust system or conduit 14. However, we have determined that the prior art arrangements experience a surging of pressure, within the sensor, which gives poor, spurious oxygen-content readings. For this reason we have employed a surge bottle 54 or plenum chamber in the discharge line 56 of the sensor 12 in order that exhaust pressure surges will be substantially eliminated. Within the chamber 58 of the sensor 12, a substantially uniform pressure will obtain, as the surge bottle 54 effectively absorbs and damps the pressure surges. The remainder of the sensor 12 is rather conventional. It comprises a housing 60 and a heater 62, the latter two elements being separated by insulation 64. The probe 66 terminates in a head 68 (from whence the oxygen-content and temperature signals are transmitted). The orifice 70 admits exhaust gases, from the conduit 14, into the chamber 58. Port 72 releases the gases to line 56 and the interposed surge bottle 54.

As noted earlier, the system 10 is usable with naturally-aspirated or turbocharged engines. In the former case, the upper compartment 74 of the valve 36 is vented to the atmosphere. In the latter case, compartment 74 is communicated with the engine carburetor intake 76 via line 78 (FIG. 1).

Engine-compressor applications of the system 10 in a gas field or patch will often dictate that an engine 16 must run on gas from any well in the patch. A problem arises when the fuel gas BTU valve varies from one well to the next. A small change in BTU valve is automatically compensated for by the control system 10, however, large variations would have to be compensated for by adjusting the force of spring 48 in the gas regulator valve 36. The FIG. 4 embodiment indicates how this matter can be handled with more facility. Each well 80, 80a, 80b, etc. has a regulator valve 36, 36a, 36b, etc. which is adjusted for proper engine performance for the BTU valve of the associated well. Thus, whenever an operator switches gas wells, a properly adjusted regulator valve is switched at the same time. The regulator valves 36, 36a, and 36b, are all commonly coupled to the transducer 26 via lines 37, 37a, and 37b. Too, the valves are commonly coupled via lines 82, 82a, and 82b to a well-selector valve 84; the latter, via line 86, supplies the fuel (gas) to the engine 16.

While we have described our invention in connection with specific embodiments thereof, it is to be clearly understood that this is done only by way of example, and not as a limitation to the scope of our invention as set forth in the objects thereof and in the appended claims.

We claim:

1. An improved combustion control system for an engine having an exhaust conduit and fuel and air inlet lines, comprising temperature and oxygen sensor means, for interpositioning in the engine exhaust conduit, for: (a) admitting engine exhaust gases thereinto, and (b) for emitting electrical signals representative of or analogous to both engine exhaust temperatures and engine exhaust oxygen content; signal comparator/controller means, coupled to said sensor means, for emitting discrete, unitary electrical signals derivative of said temperature and oxygen-content signals; and fuel-regulating means, for interpositioning in said fuel inlet line, coupled to said comparator/controller means and responsive to said discrete, unitary signals for regulating fuel conduct through said fuel inlet line; wherein the improvement comprises:

transducer means comprised by said fuel regulating means for transforming said unitary, electrical signals into analogous fluid pressures.

2. An improved combustion control system, according to claim 1, wherein:

said fuel-regulating means further comprises a fuel regulator valve;

said valve has first means normally operative for admitting fuel at a given rate of flow therethrough and alterably operative for diminishing fuel flow therethrough to less than said given rate, and second means, responsive to fluid pressure, coupled to said first means and alterably operative of the latter to effect a diminished fuel flow through said valve to less than said given rate.

3. An improved combustion control system, according to claim 1, wherein:

said transducer means comprises an electrical current-to-fluid pressure transducer, for transforming excursive, electrical-current signals into analogous, excursive fluid pressures;

said transducer having a fluid-pressure outlet; and said second means is in fluid-flow communication with said fluid-pressure outlet of said transducer.

4. An improved combustion control system, according to claim 3, wherein:

said fuel regulator valve has a fuel inlet port for admitting therethrough fuel under pressure;

said transducer has a fluid-pressure inlet; and said inlet port and said fluid-pressure inlet are in fluid-flow communication.

5. For use in combination with an engine combustion control system, an improved fuel regulator valve comprising a housing; said housing having both a pressure chamber and a fuel chamber formed therewithin; diaphragm means movably disposed with said pressure chamber dividing the latter into a plurality of variable-volume, pressure subchambers; partition means within said fuel chamber dividing the latter into a plurality of fuel subchambers; said partition means having an orificed valve seat formed therein for communicating said fuel subchambers with each other; a first port formed in said housing opening onto one of said fuel subchambers, and a second port formed in said housing opening onto another of said fuel subchambers; a valving element, coupled to said diaphragm means for common movement therewith, slidably mounted in said housing for movement onto said valve seat, and away therefrom, for closing opening, and meteringly throttling communication between said fuel subchambers third and fourth ports formed in said housing, each opening onto a respective one of said pressure subchambers; and means normally biasing said diaphragm means and said valving means in a given direction to open communication between said fuel subchambers, wherein the improvement comprises:

pneumatic means, coupled to said housing, operative for biasing said diaphragm means and said valving means in a direction contrary to said given direction.

6. An improved fuel regulator valve, according to claim 5, wherein:

said housing confines and slidably supports therewithin a translatable shaft;

said diaphragm means comprises a diaphragm fixed to one end of said shaft;

said valving element is fixed to the other end of said shaft; whereby said valving element and said diaphragm comprise shaft-end-mounted components;

said pneumatic means comprises a translatable rod; and an end of said rod abuts one of said shaft-end-mounted components.

7. An improved fuel regulator valve, according to claim 6, further including:

means biasing said rod in said contrary direction.

* * * * *

UNITED STATES PATENT AND TRADEMARK OFFICE
CERTIFICATE OF CORRECTION

PATENT NO. : 4,294,214

DATED : October 13, 1981

INVENTOR(S) : Edwin S. Treible, Jr., Joseph A. Dopkin, and Raymond N. Alford

It is certified that error appears in the above—identified patent and that said Letters Patent is hereby corrected as shown below:

In column 6, line 15, insert a comma --,-- between "closing" and "opening"; and in column 6, line 16, insert a semicolon --;-- between "subchambers" and "third".

Signed and Sealed this

Twenty-second Day of December 1981

[SEAL]

Attest:

*Attesting Officer*

GERALD J. MOSSINGHOFF

*Commissioner of Patents and Trademarks*